United States Patent
Miyazaki

(10) Patent No.: US 8,674,015 B2
(45) Date of Patent: *Mar. 18, 2014

(54) RUBBER COMPOSITION FOR SIDEWALL AND TIRE HAVING SIDEWALL USING THEREOF, AND RUBBER COMPOSITION FOR CLINCH AND TIRE HAVING CLINCH USING THEREOF

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,911

(22) Filed: Jul. 25, 2012

(65) Prior Publication Data

US 2012/0285601 A1    Nov. 15, 2012

Related U.S. Application Data

(62) Division of application No. 12/675,097, filed on Feb. 24, 2010.

(30) Foreign Application Priority Data

| Oct. 3, 2007 | (JP) | 2007-259892 |
| Oct. 3, 2007 | (JP) | 2007-259893 |

(51) Int. Cl.
  *C08K 5/36*  (2006.01)
  *C08L 9/00*  (2006.01)

(52) U.S. Cl.
  USPC ........... 524/526; 524/331; 525/194; 525/232; 525/236; 152/525; 152/547

(58) Field of Classification Search
  USPC ........................................................ 524/330
  IPC ........................................................ C08K 5/13
  See application file for complete search history.

(56) References Cited

U.S. PATENT DOCUMENTS

| 3,992,362 | A |  | 11/1976 | Martin | |
| 4,873,290 | A |  | 10/1989 | Allen et al. | |
| 5,299,615 | A |  | 4/1994 | Ataka | |
| 5,872,188 | A | * | 2/1999 | Datta et al. | 525/150 |
| 6,329,457 | B1 |  | 12/2001 | Datta et al. | |
| 8,404,766 | B2 | * | 3/2013 | Miyazaki | 524/331 |
| 2006/0047056 | A1 | * | 3/2006 | Miyazaki | 524/495 |
| 2010/0249278 | A1 | * | 9/2010 | Miyazaki | 523/438 |
| 2010/0331473 | A1 | * | 12/2010 | Miyazaki | 524/449 |

FOREIGN PATENT DOCUMENTS

| DE | 1545520 A1 | 11/1969 |
| DE | 69008009 T2 | 7/1994 |
| DE | 69104541 T2 | 2/1995 |
| DE | 69028918 T2 | 2/1997 |
| EP | 0386887 B1 | 4/1994 |
| EP | 0456437 B1 | 10/1994 |
| EP | 0463205 B1 | 10/1996 |
| GB | 1021472 A | 3/1966 |
| JP | 55-114606 A | 9/1980 |
| JP | 58-13648 A | 1/1983 |
| JP | 58-210943 A | 12/1983 |
| JP | 5-50538 B2 | 3/1986 |
| JP | 63-99250 A | 4/1988 |
| JP | 2-88658 A | 3/1990 |
| JP | 4-15111 A | 1/1992 |
| JP | 5-320421 A | 12/1993 |
| JP | 8-511050 A | 11/1996 |
| JP | 10-501291 A | 2/1998 |
| JP | 2004-238547 A | 8/2004 |
| JP | 2006-63143 A | 3/2006 |
| JP | 2006-137806 A | 6/2006 |
| JP | 2007-191677 A | 8/2007 |
| JP | 2007-246710 A | 9/2007 |
| JP | 2007246710 A * | 9/2007 |
| JP | 2007302865 A * | 11/2007 |

(Continued)

OTHER PUBLICATIONS

JP 2007-246710 A (2007), machine translation, JPO Advanced Industrial Property Network (AIPN).*

(Continued)

*Primary Examiner* — David Buttner
*Assistant Examiner* — Josephine Chang
(74) *Attorney, Agent, or Firm* — Birch, Stewart, Kolasch & Birch, LLP

(57) ABSTRACT

A rubber composition for sidewall and a tire having sidewall using thereof as well as a rubber composition for clinch and a tire having clinch using thereof that adjust scorch time and suppress surface bloom, reduce rolling resistance, can obtain sufficient rigidity as sidewall and clinch, and can improve elongation at break and durability is disclosed. Specifically, a rubber composition for sidewall and a rubber composition for clinch including specific amount of an alkylphenol-sulfur chloride condensate indicated by the formula (B1):

(B1)

$$\underset{R^1}{\overset{OH}{\bigodot}} - S_x - \left[ \underset{R^2}{\overset{OH}{\bigodot}} - S_y \right]_n - \underset{R^3}{\overset{OH}{\bigodot}}$$

and specific filler, based on a rubber component including specific amount of a natural rubber and/or an isoprene rubber and a butadiene rubber and/or an epoxidized natural rubber, and a tire having sidewall using thereof and clinch using thereof is disclosed.

4 Claims, No Drawings

(56) References Cited

FOREIGN PATENT DOCUMENTS

| WO | WO 94/29380 A1 | 12/1994 |
| WO | WO 95/34601 A1 | 12/1995 |

OTHER PUBLICATIONS

JP 2007-246710 A (2007), machine translation, JPO Advanced Industrial Property (AIPN).*

JP 2007-302865 A (2007), machine translation, JPO Advanced Industrial Property Network (AIPN).*

D.D. Flowers et al., "New tire black sidewall composition" Rubber World, vol. 204, No. 5, pp. 26-33, Aug. 1991.

Miyazaki, Machine translation of JP 2006-063143 A, Mar. 2006.

Wada et al., Machine translation of JP 2007-246710, Sep. 2007.

* cited by examiner

RUBBER COMPOSITION FOR SIDEWALL AND TIRE HAVING SIDEWALL USING THEREOF, AND RUBBER COMPOSITION FOR CLINCH AND TIRE HAVING CLINCH USING THEREOF

This application is a Divisional of co-pending application Ser. No. 12/675,097 filed on Feb. 24, 2010, which claims priority to Application Nos. 2007-259892 and 2007-259893 filed in Japan, on Oct. 3, 2007. The entire contents of all of the above applications are hereby incorporated by reference.

TECHNICAL FIELD

The present invention relates to a rubber composition for sidewall and a tire having sidewall using thereof, and a rubber composition for clinch and a tire having clinch using thereof.

BACKGROUND ART

It has been known that rolling resistance can be reduced by lowering the tan δ of a rubber composition used for the sidewall portion and clinch portion of a tire.

At that time, sulfur is used as a vulcanizing agent and a vulcanization accelerator is further used (for example, refer to Japanese Unexamined Patent Publication No. 2006-63143). However, it is known that sulfur is discharged at a final kneading step at low temperature and dispersibility is bad. Further, when the dispersion of sulfur is poor, a rubber is ununiformly vulcanized and tan δ and fracture strength is deteriorated.

Further, those such as HTS and PK900 available from Flexsys Chemicals Sdn. Bhd. and KA9188 available from Bayer AG that are hybrid crosslinking agents are used as an aid in order to suppress reversion and it is also known that a certain level of effect is obtained. However, although sulfur is partially included in HTS, fundamental solution is not carried out yet.

In order to solve the problem, methods such as oil treatment, the use of insoluble sulfur, the use of master batch of polymer and sulfur, and the use of sulfur pellet chemical (obtained by blending sulfur and a binder rubber, for example, at a ratio of 50:50) are carried out.

Further, it is also known that an alkylphenol-sulfur chloride condensate is used as the crosslinking agent of a white rubber and a butyl rubber of a tire. The alkylphenol-sulfur chloride condensate is easily scorched. Because the white rubber and butyl rubber have originally long scorch time, problems such as rubber scorch and surface bloom are not generated even if the alkylphenol-sulfur chloride condensate is used. On the other hand, since the scorch time of rubbers such as a natural rubber usually used for sidewall and clinch is not so long as the white rubber and a butyl rubber, there arises a problem such as rubber scorch during processing when the alkylphenol-sulfur chloride condensate is used as a crosslinking agent. Further, when a large amount of PVI (a retarder CTP available from OUCHISHINKO CHEMICAL INDUSTRIAL CO., LTD.) being a vulcanization retarder is compounded, there arises a problem such as the surface bloom of PVI itself. Consequently, when the alkylphenol-sulfur chloride condensate is used for sidewall and clinch, on which surface bloom is not acceptable, the PVI is required to be used for suppressing scorch. And it has been considered that PVI cannot be used because of the surface bloom.

DISCLOSURE OF INVENTION

An object of the present invention to provide a rubber composition for sidewall and a tire having sidewall using thereof as well as a rubber composition for clinch and a tire having clinch using thereof that suppress scorch and surface bloom, reduce rolling resistance, can obtain sufficient rigidity as sidewall and clinch, and can improve elongation at break and durability.

A first aspect of the present invention relates to sidewall.

The first aspect of the present invention relates to a rubber composition for sidewall including 0.2 to 10 parts by weight of (B) an alkylphenol-sulfur chloride condensate indicated by the formula (B1):

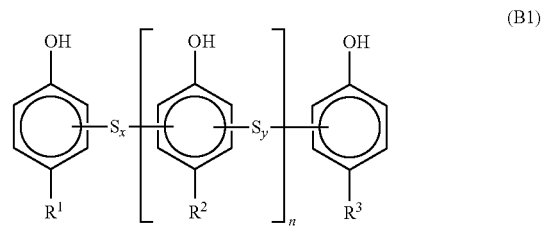

(B1)

(wherein $R^1$ to $R^3$ are same or different, each being an alkyl group having 5 to 12 carbons; x and y are same or different, each being an integer of 2 to 4; and n is an integer of 0 to 10) and 18 to 40 parts by weight of (C) at least one filler selected from a group comprising (C1) carbon black and (C2) silica, based on 100 parts by weight of (A) a rubber component including 20 to 75% by weight of (A1) a natural rubber and/or an isoprene rubber and 20 to 75% by weight of (A2) a butadiene rubber and/or an epoxidized natural rubber.

(A2) The butadiene rubber and/or epoxidized natural rubber is preferably a modified butadiene rubber.

The first aspect of the present invention also relates to a tire having sidewall using the rubber composition for sidewall.

A second aspect of the present invention relates to clinch.

The second aspect of the present invention relates to a rubber composition for clinch including 0.2 to 10 parts by weight of (B) an alkylphenol-sulfur chloride condensate indicated by the formula (B1):

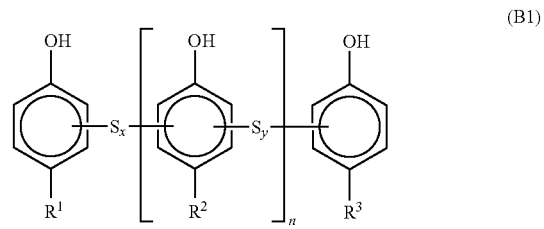

(B1)

(wherein $R^1$ to $R^3$ are same or different, each being an alkyl group having 5 to 12 carbons; x and y are same or different each being an integer of 2 to 4; and n is an integer of 0 to 10) and 40 to 60 parts by weight of (C) at least one filler selected from a group comprising (C1) carbon black and (C2) silica, based on 100 parts by weight of (A) a rubber component including 20 to 75% by weight of (A1) a natural rubber and/or an isoprene rubber and 20 to 75% by weight of (A2) a butadiene rubber and/or an epoxidized natural rubber.

The rubber composition for clinch is preferable that the compounding amount of (C2) silica is 10 to 15 parts by weight based on 100 parts by weight of the rubber component.

(A2) The butadiene rubber and/or epoxidized natural rubber is preferably a modified butadiene rubber.

The second aspect of the present invention also relates to a tire having clinch using the rubber composition for clinch.

BEST MODE FOR CARRYING OUT THE INVENTION

Content common to the first aspect of the present invention relating to sidewall and the second aspect of the present invention relating to clinch is illustrated. The rubber composition for sidewall and the rubber composition for clinch of the present invention include a rubber component (A), an alkylphenol-sulfur chloride condensate (B) and filler (C).

The rubber component (A) includes a natural rubber (NR) and/or an isoprene rubber (IR) (A1) and a butadiene rubber (BR) and/or an epoxidized natural rubber (ENR) (A2).

As the NR, those such as RSS#3 grades that are general in the rubber industry can be used. Also as the IR, those that are general in the rubber industry can be used.

The content of the NR and/or IR (A1) in the rubber component (A) is at least 20% by weight and preferably at least 30% by weight. When the content of the NR and/or IR (A1) is less than 20% by weight, strength at break is lowered. Further, the content of the NR and/or IR (A1) in the rubber component (A) is at most 75% by weight and preferably at most 70% by weight. When the content of the NR and/or IR (A1) exceeds 75% by weight, crack growth resistance is deteriorated.

As the BR, those such as a high cis content butadiene rubber (high cis BR) and a modified butadiene rubber (modified BR) are listed.

In the present invention relating to sidewall and clinch, the butadiene rubber and/or epoxidized natural rubber (A2) used for the rubber composition for sidewall and the rubber composition for clinch is preferably a modified butadiene rubber, because rim chafing property can be secured and low heat build-up is enabled.

The high cis BR is not particularly limited and those such as BR150B manufactured by Ube Industries Ltd., usually used in the rubber industry, can be used.

The modified BR is not also particularly limited, but one is preferable that is obtained by polymerizing 1,3-butadiene with a lithium initiator and then adding a tin compound and where the terminal of the modified BR molecule is bonded with a tin-carbon bonding.

The lithium initiator includes lithium compounds such as an alkyl lithium, aryl lithium, vinyl lithium, organic tin lithium and organic nitrogen lithium compound, and lithium metal. The modified BR with high vinyl content and low cis content can be prepared by using the lithium initiator as the initiator of the modified BR.

The tin compound includes tin tetrachloride, butyltin trichloride, dibutyltin dichloride, dioctyltin dichloride, tributyltin chloride, triphenyltin chloride, diphenyl dibutyltin, triphenyltin ethoxide, diphenyl dimethyltin, ditolyltin chloride, diphenyltin dioctanoate, divinyl diethyltin, tetrabenzyltin, dibutyltin di-stearate, tetraallyltin, and p-tributyltin styrene. These tin compounds may be used alone and at least two kinds may be used in combination.

The content of a tin atom in the modified BR is preferably at least 50 ppm and more preferably at least 60 ppm in the view point that effect for promoting the dispersion of carbon black in the modified BR is great and tan δ can be reduced. Further, the content of a tin atom is preferably at most 3000 ppm, more preferably at most 2500 ppm and further preferably at most 250 ppm in the view point that the cohesiveness of a kneaded article is good and edges are arranged, and therefore the extrusion processability of the kneaded article is superior.

The molecular weight distribution (Mw/Mn) of the modified BR is preferably at most 2 and more preferably at most 1.5 in the view point that the dispersibility of carbon black is superior and tan δ can be reduced. Further, the preferable lower limit of Mw/Mn is 1.

Further, as the BR, a butadiene rubber (SPB-including BR) including 1,2-syndiotactic polybutadiene crystals can also be used in addition to the high cis BR and the modified BR.

In the present invention, ENR is used when module other than petroleum is adopted.

As the ENR, a commercially available ENR may be used and ENR obtained by epoxidizing NR may be used. A method of epoxidizing NR is not particularly limited and can be carried out using methods such as a chlorohydrin method, a direct oxidation method, a hydrogen peroxide method, an alkylhydroperoxide method and a peracid method. For example, methods such as a method of reacting organic acids such as peracetic acid and performic acid with NR are listed.

The epoxidization ratio of the ENR is preferably 12 to 50% by mol in the view point that it is not compatible with NR and IR and rubber strength is sufficiently obtained.

The content of the BR and/or ENR (A2) in the rubber component (A) is at least 20% by weight and preferably at least 30% by weight. When the content of the BR and/or ENR (A2) is less than 20% by weight, crack growth resistance is deteriorated. Further, the content of the BR and/or ENR (A2) in the rubber component (A) is at most 75% by weight and preferably at most 70% by weight. When the content of the BR and/or ENR (A2) exceeds 75% by weight, strength at break is lowered.

As the rubber component (A), rubber components other than the NR and/or IR (A1) and the BR and/or ENR (A2) that have been conventionally used usually in the rubber industry, such as a styrene-butadiene rubber (SBR), styrene-isoprene-butadiene rubber (SIBR), butyl rubber (IIR), halogenated butyl rubber (X-IIR), chloroprene rubber (CR), acrylonitrile-butadiene rubber (NBR) and ethylene-propylene-diene rubber (EPDM) can also be used. When these rubbers are used, they may be used alone and at least two kinds may be used in combination, but their amounts that do not alter the compounding amounts of the NR and/or IR (A1) and the BR and/or ENR (A2) and do not damage the effect of the present invention are preferable.

The rubber composition having sufficiently high hardness applicable for sidewall and clinch can be obtained by using the alkylphenol-sulfur chloride condensate (B) in the present invention.

The alkylphenol-sulfur chloride condensate (B) is used as the crosslinking agent of a white rubber and a butyl rubber. Although the alkylphenol-sulfur chloride condensate is easily scorched, the problem of surface bloom is not generated even if the alkylphenol-sulfur chloride condensate is used, because the white rubber and butyl rubber have originally long scorch time. On the other hand, since the scorch time of rubbers such as a natural rubber usually used for sidewall and clinch is not so long as that of the white rubber and butyl rubber in like manner as the present invention, there arises a problem such as rubber scorch during processing when the alkylphenol-sulfur chloride condensate is used as a crosslinking agent; therefore a vulcanization retarder cannot help being compounded and surface bloom caused by the vulcanization retarder compounded at this time causes a problem. Consequently, it has been considered that the alkylphenol-sulfur chloride condensate cannot be compounded in sidewall and clinch for which surface bloom by the vulcanization retarder cannot be approved, but in the present invention, even if the alkylphenol-sulfur chloride condensate is applied to sidewall and clinch, scorch is not too short by adjusting the compounding amount of the filler (C); therefore the problem of surface bloom is solved.

The alkylphenol-sulfur chloride condensate (B) is a compound indicated by the formula (B1):

$$\text{(B1)}\quad \underset{R^1}{\underset{|}{\text{HO-C}_6\text{H}_3}}-S_x-\left[\underset{R^2}{\underset{|}{\text{HO-C}_6\text{H}_3}}-S_y\right]_n-\underset{R^3}{\underset{|}{\text{HO-C}_6\text{H}_3\text{-OH}}}$$

(wherein $R^1$ to $R^3$ are same or different, each being an alkyl group having 5 to 12 carbons; x and y are same or different, each being an integer of 2 to 4; and n is an integer of 0 to 10).

n is preferably an integer of 0 to 10 and more preferably an integer of 1 to 9 in the view point that the dispersibility of the alkylphenol-sulfur chloride condensate (B) in the rubber component (A) is good.

x and y are same or different, each is preferably an integer of 2 to 4 and both are more preferably 2 in the view point that high hardness can be efficiently exhibited (the suppression of reversion).

Each of $R^1$ to $R^3$ is preferably an alkyl group having 5 to 12 carbons and more preferably an alkyl group having 6 to 9 carbons in the view point that the dispersibility of the alkylphenol-sulfur chloride condensate (B) in the rubber composition (A) is good.

The alkylphenol-sulfur chloride condensate (B) can be prepared by known methods and its method is not particularly limited, but for example, a method of reacting alkylphenol with sulfur chloride at a ratio of 1:0.9 to 1.25 is listed.

As the specific example of the alkylphenol-sulfur chloride condensate (B), there is listed TACKROL V200 available from Taoka Chemical Co., Ltd. in which n is 0 to 10, x and y are 2, R is $C_8H_{17}$ (octyl group) and the content of sulfur is 24% by weight:

$$\underset{C_8H_{17}}{\underset{|}{\text{HO-C}_6\text{H}_3}}-S_2-\left[\underset{C_8H_{17}}{\underset{|}{\text{HO-C}_6\text{H}_3}}-S_2\right]_n-\underset{C_8H_{17}}{\underset{|}{\text{HO-C}_6\text{H}_3\text{-OH}}}$$

(wherein n is an integer of 0 to 10).

The compounding amount of the alkylphenol-sulfur chloride condensate (B) is at least 0.2 parts by weight and preferably at least 0.3 parts by weight based on 100 parts by weight of the rubber component (A). When the compounding amount of the alkylphenol-sulfur chloride condensate (B) is less than 0.2 parts by weight, effect of improving rolling resistance (the reduction of tan δ) is not sufficiently obtained. Further, the compounding amount of the alkylphenol-sulfur chloride condensate (B) is at most 10 parts by weight and preferably at most 9 parts by weight based on 100 parts by weight of the rubber component (A). When the compounding amount of the alkylphenol-sulfur chloride condensate (B) exceeds 10 parts by weight, scorch time is shortened and rubber scorch is generated during processing.

The filler (C) is at least one filler selected from a group comprising carbon black (C1) and silica (C2).

The carbon black (C1) is not particularly limited and grades such as SAF, ISAF, HAF, FEF and GPF, usually used in the rubber industry, can be used.

Further, the silica (C2) is not particularly limited and those prepared by a wet process or a dry process can be used.

The compounding amount of the filler (C) is illustrated in the first aspect of the present invention relating to sidewall. In the rubber composition for sidewall, the compounding amount of the filler (C) is at least 18 parts by weight and preferably at least 20 parts by weight based on 100 parts by weight of the rubber component (A). In the rubber composition for sidewall in which the compounding amount of the filler (C) is less than 18 parts by weight, strength at break is insufficient, curbstone cut is generated and a problem is generated in durability. Further, the compounding amount of the filler (C) is at most 40 parts by weight and preferably at most 37 parts by weight based on 100 parts by weight of the rubber component (A). In the rubber composition for sidewall in which the compounding amount of the filler (C) exceeds 40 parts by weight, tan δ is great and rolling resistance is also great. Further, at least 5 parts by weight of the carbon black (C1) is preferably compounded for preventing deterioration by ultraviolet rays.

The compounding amount of the filler (C) is illustrated in the second aspect of the present invention relating to clinch. In the rubber composition for clinch, the compounding amount of the filler (C) is at least 40 parts by weight and preferably at least 43 parts by weight based on 100 parts by weight of the rubber component (A). In the rubber composition for clinch in which the compounding amount of the filler (C) is less than 40 parts by weight, strength at break is insufficient, curbstone cut is generated and a problem is generated in durability. Further, the compounding amount of the filler (C) is at most 60 parts by weight and preferably at most 55 parts by weight based on 100 parts by weight of the rubber component (A). In the rubber composition for clinch in which the compounding amount of the filler (C) exceeds 60 parts by weight, tan δ is great and rolling resistance is also great. Further, at least 5 parts by weight of the carbon black (C1) is preferably compounded for preventing deterioration by ultraviolet rays.

Further, 10 to 15 parts by weight of silica (C2) in the rubber composition for clinch is preferably compounded for hardly generating rubber scorch during processing.

When silica (C2) is used as the filler (C), a silane coupling agent is preferably used in combination.

The silane coupling agent is not particularly limited, and those having been conventionally used in combination with silica (C2) can be used. For example, there are listed sulfides such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl) tetrasulfide, bis(3-triethoxysilylpropyl)trisulfide, bis(2-triethoxysilylethyl)trisulfide, bis(4-triethoxysilylbutyl) trisulfide, bis(3-trimethoxysilylpropyl)trisulfide, bis(2-trimethoxysilylethyl)trisulfide, bis(4-trimethoxysilylbutyl) trisulfide, bis(3-triethoxysilylpropyl)disulfide, bis(2-triethoxysilylethyl)disulfide, bis(4-triethoxysilylbutyl) disulfide, bis(3-trimethoxysilylpropyl)disulfide, bis(2-trimethoxysilylethyl)disulfide, bis(4-trimethoxysilylbutyl) disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoltetrasulfide, 3-triethoxysilylpropyl methacrylate monosulfide and 3-trimethoxysilylpropyl methacrylate monosulfide; mercapto series such as 3-mercaptopropyltrimethoxysilane, 3-mercaptopropyltriethoxysilane, 2-mercaptoethyltrimethoxysilane and 2-mercaptoethyltriethoxysilane; vinyl series such as vinyl triethoxysilane and vinyl trimethoxysilane; amino series such as 3-aminopropyltriethoxysilane, 3-aminopropyltrimethoxysilane, 3-(2-aminoethyl)aminopropyl triethoxysilane, and 3-(2-aminoethyl)aminopropyl trimethoxysilane; glycidoxy series such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro series such as 3-nitropropyltrimethoxysilane and 3-nitropropyltriethoxysilane; chloro series such as 3-chloropropyltrimethoxysilane, 3-chloropropyltriethoxysilane, 2-chloroethyltrimethoxysilane and 2-chloroethyltriethoxysilane.

In the rubber composition for sidewall, the compounding amount of the silane coupling agent is preferably 4 to 10 parts by weight based on 100 parts by weight of silica (C2) in the view point that silica is dispersed and high strength at break can be kept.

In the rubber composition for clinch, the compounding amount of the silane coupling agent is preferably 2 to 10 parts by weight based on 100 parts by weight of silica (C2) in the view point that silica is dispersed and high strength at break can be kept.

In the present invention, calcium stearate is preferably compounded when ENR is used as the rubber component (A).

In the rubber composition for sidewall, the compounding amount of calcium stearate is preferably 2 to 10 parts by weight based on 100 parts by weight of ENR in the view point that the lowering of strength at break during usage is prevented.

In the rubber composition for clinch, the compounding amount of calcium stearate is preferably 4 to 10 parts by weight based on 100 parts by weight of ENR in the view point that the lowering of strength at break during usage is prevented.

In the rubber composition for sidewall and the rubber composition for clinch of the present invention, there can be suitably compounded compounding agents conventionally used in the rubber industry, such as oil, stearic acid, an antioxidant, wax, zinc oxide, a vulcanizing agent such as sulfur, and various vulcanization accelerators if necessary, in addition to the rubber component (A), the alkylphenol-sulfur chloride condensate (B), the filler (C), the silane coupling agent and calcium stearate.

The compounding amounts of these other compounding agents are within a range not damaging the effect of the present invention by the rubber component (A), the alkylphenol-sulfur chloride condensate (B) and the filler (C).

The rubber composition for sidewall and the rubber composition for clinch of the present invention are prepared by a general method. Namely, the rubber composition for sidewall and the rubber composition for clinch of the present invention can be prepared by kneading the rubber component (A), the alkylphenol-sulfur chloride condensate (B), the filler (C) and other compounding agents if necessary, with a Banbury mixer, a kneader and an open roll and then, vulcanizing them.

The rubber composition for sidewall of the present invention is used as the sidewall of a tire in the view point that strength at break, crack growth resistance and the property of low tan δ are pursued.

The rubber composition for clinch of the present invention is used as the clinch of a tire in the view point that strength at break, crack growth resistance and the property of low tan δ are pursued.

The tire of the present invention is produced by a usual method using the rubber composition for sidewall and/or the rubber composition for clinch of the present invention. Namely, the rubber composition of the present invention compounding the compounding agents if necessary is extruded and processed in matching with the shape of the sidewall and/or clinch of a tire at an unvulcanization stage and molded on a tire molding machine by a usual method; thereby an unvulcanized tire is formed. The unvulcanized tire is heated and pressurized in a vulcanizer to obtain a tire.

EXAMPLES

First, the present invention is specifically illustrated based on Examples in the first aspect of the present invention relating to sidewall, but the present invention is not limited only thereto.

Then, various chemicals used in Examples and Comparative Examples are illustrated in summary.

Natural rubber (NR): RSS#3.

Epoxidized natural rubber (ENR): ENR25 (epoxidization ratio: 25% by mol) manufactured by Kumpulan Guthrie Berhad Modified butadiene rubber (modified BR): Nipol BR1250H (modified BR, lithium initiator: lithium, content of tin atom: 250 ppm, Mw/Mn: 1.5, and vinyl bonding amount: 10 to 13% by weight) manufactured by ZEON Corporation.

High cis content butadiene rubber (High cis BR): BR150B manufactured by Ube Industries Ltd.

Carbon black: SHOWBLACK N660 (GPF) available from CABOT JAPAN LTD.

Silica: 115GR available from RHODIA S.A.

Silane coupling agent: Si69 (bis(3-triethoxysilylpropyl)tetrasulfide) available from Degussa Huls Co.

Aromatic oil: PROCESS X-140 available from Japan Energy Co., Ltd.

Stearic acid: Stearic acid available from NOF Corporation.

Antioxidant: NOCRAC 6C (N-(1,3-dimethylbutyl)-N'-phenyl-p-phenylenediamine) available from OUCHISHINKO CHEMICAL INDUSTRIAL CO., LTD.

Wax: SUNNOC WAX available from OUCHISHINKO CHEMICAL INDUSTRIAL CO., LTD.

Zinc oxide: ZINC OXIDE available from Mitsui Mining And Smelting Co., Ltd.

Calcium stearate: GF200 available from NOF Corporation.

Insoluble sulfur: Seimi sulfur (insoluble sulfur including at least 60% of insoluble content by carbon disulfide, and oil content: 10%) available from NIPPON KANRYU Industry Co., Ltd.

Vulcanization accelerator: NOCCELER NS (N-tert-butyl-2-benzothiazolyl sulfenamide) available from OUCHISHINKO CHEMICAL INDUSTRIAL CO., LTD.

V200: TACKROL V200 (alkylphenol-sulfur chloride condensate, and n: 0 to 10 in the formula below) available from Taoka Chemical Co., Ltd.

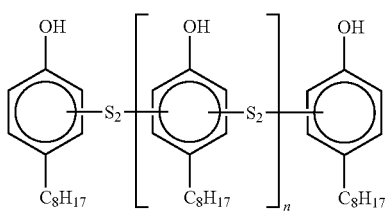

HTS: Sodium 1,6-hexamethylenedithio sulfate dihydrate available from Flexsys Chemicals Sdn. Bhd.

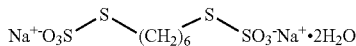

PK900: PK900 (1,3-bis(citraconimidemethyl)benzene) available from Flexsys Chemicals Sdn. Bhd.

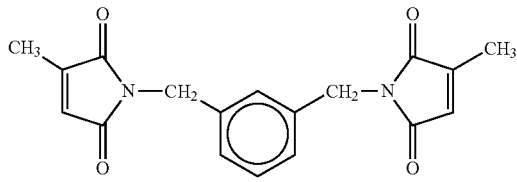

Examples 1 to 6 and Comparative Examples 1 to 6

Chemicals other than sulfur, a vulcanization accelerator and V200 were kneaded with a Banbury mixer according to the compounding prescription shown in Table 1 to obtain kneaded articles. Then, sulfur, a vulcanization accelerator and V200 were added to the kneaded articles obtained, and the mixture was kneaded with an open roll to obtain unvulcanized rubber compositions for sidewall. The resultant unvulcanized rubber compositions for sidewall were vulcanized by pressing under the condition of 170° C. for 12 minutes to prepare the vulcanized rubber compositions for sidewall of Examples 1 to 6 and Comparative Examples 1 to 6.

(Curelasto Test)

Time T10 (min) at which torque was increased by 10% was measured at 160° C. by vulcanizing test pieces while applying vibration, using a curelastometer. T10 is preferably 2.0 to 5.0 minutes in order to suppress rubber scorch and soddenness (such as bad adhesion) during processing.

(Viscoelasticity Test)

The complex elastic modulus (E*) and loss tangent (tan δ) of the vulcanized rubber compositions was measured under the conditions of a temperature of 70° C., a frequency of 10 Hz, an initial stain of 10% and a dynamic strain of 2%, using a viscoelasticity spectrometer VES (manufactured by Iwamoto Seisakusyo K.K.). It is indicated that the larger the E* is, the higher the rigidity is and the more superior the steering stability is, and the smaller the tan δ is, the more superior the low fuel cost is.

(Tensile Test)

Tensile test was carried out according to JIS K 6251 "Vulcanized rubber and thermoplastic rubber—Determination method of tensile property", using No. 3 dumbbell type test pieces made from the vulcanized rubber compositions and elongation at break EB (%) was measured. It is indicated that the larger the EB is, the more superior it is.

(Heavy Load Durability Drum Test)

The unvulcanized rubber compositions were molded in a shape of sidewall, the molded articles were laminated with other tire members to form unvulcanized tires and they were vulcanized by pressing under condition of 170° C. for 12 minutes to produce tires for test (size: 195/65R15).

The tires ran on a drum at a speed of 20 km/h under condition of a maximum load (maximum inner pressure condition) by JIS Specification of 230% load and running distances until tires were damaged were measured. Then, the durability index of Comparative Example 1 was referred to as 100 and the running distances of respective compoundings were displayed by indices according to the calculation formula below. Further, it is indicated that the larger the durability index is, the more superior the durability is and the better it is.

(Durability index)=(Running distance of each compounding)/(Running distance of Comparative Example 1)×100

The evaluation results of the fore-mentioned tests are shown in Table 1.

TABLE 1

| | Examples | | | | | | Comparative Examples | | | | | |
|---|---|---|---|---|---|---|---|---|---|---|---|---|
| | 1 | 2 | 3 | 4 | 5 | 6 | 1 | 2 | 3 | 4 | 5 | 6 |
| Compounding amount (parts by weight) | | | | | | | | | | | | |
| NR | 60 | 60 | 60 | 60 | 60 | 60 | 60 | 60 | 60 | 60 | 60 | 60 |
| ENR | — | — | — | — | 40 | — | — | — | — | — | — | — |
| Modified BR | 40 | 40 | — | 40 | — | 40 | 40 | 40 | 40 | 40 | 40 | 40 |
| High cis BR | — | — | 40 | — | — | — | — | — | — | — | — | — |
| Carbon black | 30 | 30 | 30 | 22 | 30 | 10 | 30 | 50 | 30 | 30 | 15 | 30 |
| Silica | — | — | — | — | — | 20 | — | — | — | — | — | — |
| Silane coupling agent | — | — | — | — | — | 1.6 | — | — | — | — | — | — |
| Aromatic oil | 6 | 6 | 6 | 6 | 6 | 6 | 6 | 6 | 6 | 6 | 6 | 6 |
| Stearic acid | 2 | 2 | 2 | 2 | 2 | 2 | 2 | 2 | 2 | 2 | 2 | 2 |
| Antioxidant | 3 | 3 | 3 | 3 | 3 | 3 | 3 | 3 | 3 | 3 | 3 | 3 |
| Wax | 1 | 1 | 1 | 1 | 1 | 1 | 1 | 1 | 1 | 1 | 1 | 1 |
| Zinc oxide | 4 | 4 | 4 | 4 | 4 | 4 | 4 | 4 | 4 | 4 | 4 | 4 |
| Calcium stearate | — | — | — | — | 3 | — | — | — | — | — | — | — |
| Insoluble sulfur | 2.11 | 1.88 | 2.11 | 2.11 | 2.11 | 2.11 | 2.33 | 2.11 | 2.11 | 2.11 | 2.11 | 1.88 |
| (Content of pure sulfur) | (1.9) | (1.7) | (1.9) | (1.9) | (1.9) | (1.9) | (2.1) | (1.9) | (1.9) | (1.9) | (1.9) | (1.7) |

TABLE 1-continued

| | Examples | | | | | | Comparative Examples | | | | | |
|---|---|---|---|---|---|---|---|---|---|---|---|---|
| | 1 | 2 | 3 | 4 | 5 | 6 | 1 | 2 | 3 | 4 | 5 | 6 |
| Vulcanization accelerator | 1.1 | 1.1 | 1.1 | 1.1 | 1.1 | 1.1 | 1.1 | 1.1 | 1.1 | 1.1 | 1.1 | 1.1 |
| V200 | 1 | 2 | 1 | 1 | 1 | 1 | — | 1 | — | — | 1 | 15 |
| HTS | — | — | — | — | — | — | — | — | 1 | — | — | — |
| PK900 | — | — | — | — | — | — | — | — | — | 1 | — | — |
| Evaluation result | | | | | | | | | | | | |
| T10 | 2.5 | 2.3 | 2.5 | 2.7 | 2.4 | 2.8 | 4.4 | 1.6 | 4.1 | 4.4 | 3.2 | 0.8 |
| E* | 4.0 | 4.1 | 4.1 | 3.2 | 4.3 | 3.3 | 4.0 | 5.2 | 3.7 | 3.7 | 2.8 | 5.9 |
| tanδ | 0.085 | 0.083 | 0.115 | 0.066 | 0.105 | 0.093 | 0.092 | 0.121 | 0.094 | 0.093 | 0.052 | 0.060 |
| EB (%) | 400 | 405 | 420 | 350 | 370 | 350 | 350 | 400 | 390 | 400 | 300 | 220 |
| Durability index | 140 | 110 | 100 | 120 | 100 | 170 | 100 | 60 | 120 | 120 | 40 | 50 |

Then, the present invention is specifically illustrated based on Examples in the second aspect of the present invention relating to clinch, but the present invention is not limited only thereto.

Then, various chemicals used in Examples and Comparative Examples are illustrated in summary.

Natural rubber (NR): RSS#3.
Modified butadiene rubber (modified BR): Nipol BR1250H (modified BR, lithium initiator: lithium, content of tin atom: 250 ppm, Mw/Mn: 1.5 and vinyl bonding amount: 10 to 13% by weight) manufactured by ZEON Corporation.
High cis content butadiene rubber (High cis BR): BR150B manufactured by Ube Industries Ltd.
Carbon black: SHOWBLACK N330 (HAF) available from CABOT JAPAN LTD.
Silica: 115GR available from RHODIA S.A.
Silane coupling agent: Si69 (Bis(3-triethoxysilylpropyl)tetrasulfide) available from Degussa Huls Co.
Aromatic oil: PROCESS X-140 available from Japan Energy Co., Ltd.
Stearic acid: Stearic acid available from NOF Corporation.
Antioxidant: NOCRAC 6C (N-(1,3-dimethylbutyl)-N'-phenyl-p-phenylenediamine) available from OUCHISHINKO CHEMICAL INDUSTRIAL CO., LTD.
Wax: SUNNOC WAX available from OUCHISHINKO CHEMICAL INDUSTRIAL CO., LTD.
Zinc oxide: ZINC OXIDE available from Mitsui Mining And Smelting Co., Ltd.
Calcium stearate: GF200 available from NOF Corporation.
Insoluble sulfur: Seimi sulfur (insoluble sulfur including at least 60% of insoluble content by carbon disulfide, and oil content: 10%) available from NIPPON KANTRYU Industry Co., Ltd.
Vulcanization accelerator: NOCCELER NS (N-tert-butyl-2-benzothiazolyl sulfenamide) available from OUCHISHINKO CHEMICAL INDUSTRIAL CO., LTD.
V200: TACKROL V200 (alkylphenol-sulfur chloride condensate, and n: 0 to 10 in the formula below) available from Taoka Chemical Co., Ltd.

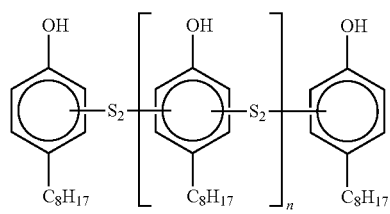

PVI: Retarder CTP available from OUCHISHINKO CHEMICAL INDUSTRIAL CO., LTD.

Examples 7 to 12 and Comparative Examples 7 to 11

Chemicals other than sulfur, a vulcanization accelerator, V200 and PVI were kneaded with a Banbury mixer according to the compounding prescription shown in Table 2 to obtain kneaded articles. Then, sulfur, a vulcanization accelerator, V200 and PVI were added to the kneaded articles obtained, and the mixture was kneaded with an open roll to obtain unvulcanized rubber compositions for clinch. The resultant unvulcanized rubber compositions for clinch were vulcanized by pressing under the condition of 170° C. for 12 minutes to prepare the vulcanized rubber compositions for clinch of Examples 1 to 6 and Comparative Examples 1 to 5.

(Curelasto Test)
Time T10 (min) at which torque was increased by 10% was measured at 160° C. by vulcanizing test pieces while applying vibration, using a curelastometer. When T10 is less than 2.2 minutes, rubber scorch is generated during extrusion processing.

(Viscoelasticity Test)
The complex elastic modulus (E*) and loss tangent (tan δ) of the vulcanized rubber compositions was measured under the conditions of a temperature of 70° C., a frequency of 10 Hz, an initial stain of 10% and a dynamic strain of 2%, using a viscoelasticity spectrometer VES (manufactured by Iwamoto Seisakusyo K.K.). The E* is preferably about 6.0 to 8.0 in order to prevent contact with a rim and abrasion.

(Tensile Test)
Tensile test was carried out according to JIS K 6251 "Vulcanized rubber and thermoplastic rubber—Determination method of tensile property", using No. 3 dumbbell type test pieces comprising the vulcanized rubber compositions and elongation at break EB (%) was measured. It is indicated that the larger the EB is, the more superior it is.

(Heavy Load Durability Drum Test)
The unvulcanized rubber compositions were molded in a shape of clinch, the molded articles were laminated with other tire members to form unvulcanized tires and they were vulcanized by pressing under condition of 170° C. for 12 minutes to produce tires for test (size: 195/65R15).

The tires ran on a drum at a speed of 20 km/h under condition of a maximum load (maximum inner pressure condition) by JIS Specification of 230% load and running distances until tires were damaged were measured. Then, the durability index of Comparative Example 7 was referred to as 100 and the running distances of respective compoundings were displayed by indices according to the calculation formula below. Further, it is indicated that the larger the durability index is, the more superior the durability is and the better it is.

(Durability index)=(Running distance of each compounding)/(Running distance of Comparative Example 7)×100

The evaluation results of the fore-mentioned tests are shown in Table 2.

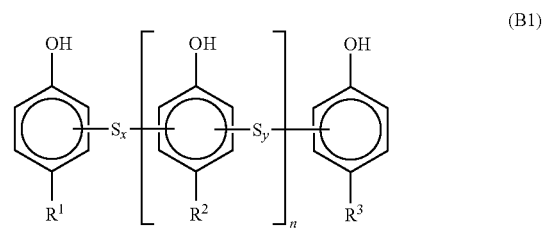

(B1)

TABLE 2

|  | Examples |  |  |  |  |  | Comparative Examples |  |  |  |  |
|---|---|---|---|---|---|---|---|---|---|---|---|
|  | 7 | 8 | 9 | 10 | 11 | 12 | 7 | 8 | 9 | 10 | 11 |
| Compounding amount (parts by weight) |  |  |  |  |  |  |  |  |  |  |  |
| NR | 35 | 35 | 35 | 35 | 35 | 35 | 35 | 35 | 35 | 35 | 35 |
| Modified BR | 65 | 65 | — | 65 | 65 | — | 65 | 65 | 65 | — | 65 |
| High cis BR | — | — | 65 | — | — | — | — | — | — | 65 | — |
| ENR | — | — | — | — | — | 65 | — | — | — | — | — |
| Carbon black | 32 | 44 | 32 | 32 | 42 | 32 | 32 | 44 | 50 | 32 | 32 |
| Silica | 12 | — | 12 | 12 | 12 | 12 | 12 | — | 12 | 12 | 12 |
| Silane coupling agent | 0.96 | — | 0.96 | 0.96 | 0.96 | 0.96 | 0.96 | — | 0.96 | 0.96 | 0.96 |
| Aromatic oil | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 |
| Antioxidant | 2 | 2 | 2 | 2 | 2 | 2 | 2 | 2 | 2 | 2 | 2 |
| Wax | 1 | 1 | 1 | 1 | 1 | 1 | 1 | 1 | 1 | 1 | 1 |
| Zinc oxide | 3 | 3 | 3 | 3 | 3 | 3 | 3 | 3 | 3 | 3 | 3 |
| Calcium stearate | — | — | — | — | — | 4 | — | — | — | — | — |
| Insoluble sulfur | 2.56 | 2.56 | 2.56 | 2.33 | 2.33 | 2.56 | 2.78 | 2.78 | 2.33 | 2.78 | 2.33 |
| (Content of pure sulfur) | (2.3) | (2.3) | (2.3) | (2.1) | (2.1) | (2.3) | (2.5) | (2.5) | (2.1) | (2.5) | (2.1) |
| Vulcanization accelerator | 2.4 | 2.4 | 2.4 | 2.4 | 2.0 | 2.4 | 2.4 | 2.4 | 2.0 | 2.4 | 2.4 |
| V200 | 1.0 | 1.0 | 1.0 | 2.0 | 1.0 | 1.0 | — | — | 1.0 | — | 15 |
| PVI | 0.4 | 0.4 | 0.4 | 0.6 | 0.6 | 0.4 | — | — | 0.4 | — | 0.6 |
| Evaluation result |  |  |  |  |  |  |  |  |  |  |  |
| T10 | 3.2 | 2.3 | 3.3 | 2.2 | 2.5 | 2.3 | 3.0 | 2.0 | 1.7 | 3.1 | 0.6 |
| E* | 6.3 | 6.8 | 6.4 | 6.4 | 6.5 | 6.5 | 6.3 | 6.9 | 7.8 | 6.3 | 9.3 |
| tanδ | 0.098 | 0.110 | 0.135 | 0.094 | 0.118 | 0.133 | 0.120 | 0.124 | 0.130 | 0.151 | 0.083 |
| EB (%) | 320 | 280 | 350 | 305 | 380 | 340 | 290 | 200 | 230 | 330 | 160 |
| Durability index | 140 | 110 | 90 | 140 | 120 | 105 | 100 | 70 | 65 | 60 | 50 |

INDUSTRIAL APPLICABILITY

According to the present invention, there can be provided a rubber composition for sidewall and a tire having sidewall using thereof as well as a rubber composition for clinch and a tire having clinch using thereof that suppress scorch and surface bloom, reduce rolling resistance, can obtain adequate rigidity as sidewall and clinch and can improve elongation at break and durability, by including the specific amounts of the specific rubber component (A), the specific alkylphenol-sulfur chloride condensate (B) and the specific filler (C).

The invention claimed is:

1. A rubber composition for clinch comprising
   1.0 to 2.0 parts by weight of (B) an alkylphenol-sulfur chloride condensate indicated by the formula (B1):

wherein $R^1$ to $R^3$ are each an alkyl group having 8 carbons; x and y are same or different, each being an integer of 2 to 4; and n is an integer of 0 to 10 and 40 to 60 parts by weight of (C) at least one filler selected from the group consisting of (C1) carbon black and (C2) silica, based on 100 parts by weight of a rubber component comprising 20 to 75% by weight of (A1) a natural rubber and/or an isoprene rubber and 20 to 75% by weight of (A2) a butadiene rubber and/or an epoxidized natural rubber.

2. The rubber composition for clinch of claim 1, wherein the compounding amount of (C2) silica is 10 to 15 parts by weight based on 100 parts by weight of the rubber component.

3. The rubber composition for clinch of claim 1, wherein (A2) the butadiene rubber of (A2) is a modified butadiene rubber.

4. A tire having a clinch comprising the rubber composition for clinch of claim 1.

\* \* \* \* \*

UNITED STATES PATENT AND TRADEMARK OFFICE
CERTIFICATE OF CORRECTION

Page 1 of 1

PATENT NO.        : 8,674,015 B2
APPLICATION NO.   : 13/557911
DATED             : March 18, 2014
INVENTOR(S)       : Tatsuya Miyazaki It is certified that error appears in the above-identified patent and that said Letters Patent is hereby corrected as shown below:

ON THE TITLE PAGE:

At item 62, Related U.S. Application Data, change "Division of application No. 12/675,097, filed on Feb. 24, 2010" to --Division of application No. 12/675,097, filed as application No. PCT/JP2008/067175 on Sep. 24, 2008, now Pat. No. 8,674,014--.

Signed and Sealed this
Twenty-first Day of October, 2014

Michelle K. Lee
*Deputy Director of the United States Patent and Trademark Office*